United States Patent
Taverner

(10) Patent No.: US 8,243,369 B2
(45) Date of Patent: Aug. 14, 2012

(54) WAVELENGTH MONITORED AND STABILIZED SOURCE

(75) Inventor: Domino Taverner, Farmington, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 136 days.

(21) Appl. No.: 12/902,063

(22) Filed: Oct. 11, 2010

(65) Prior Publication Data

US 2011/0026127 A1 Feb. 3, 2011

Related U.S. Application Data

(62) Division of application No. 11/855,297, filed on Sep. 14, 2007, now Pat. No. 7,813,046.

(51) Int. Cl.
*G02B 27/14* (2006.01)
*H01J 40/14* (2006.01)
*G01J 1/58* (2006.01)

(52) U.S. Cl. ............ 359/629; 250/226; 250/458.1

(58) Field of Classification Search ......... 250/458.1, 250/226; 315/169.3; 359/629; 398/202
See application file for complete search history.

(56) References Cited

U.S. PATENT DOCUMENTS

| | | | |
|---|---|---|---|
| 6,097,487 A | 8/2000 | Kringlebotn et al. | |
| 7,813,046 B2 | 10/2010 | Taverner | |
| 2002/0131756 A1 | 9/2002 | Hung | |
| 2004/0052276 A1 | 3/2004 | Lou et al. | |
| 2004/0109694 A1 | 6/2004 | Suzuki et al. | |
| 2004/0160596 A1 | 8/2004 | He et al. | |
| 2004/0263856 A1 | 12/2004 | Willig et al. | |
| 2005/0088660 A1 | 4/2005 | Ronnekleiv | |
| 2005/0134861 A1 | 6/2005 | Kringlebotn et al. | |
| 2005/0191008 A1 | 9/2005 | Anson et al. | |
| 2006/0076476 A1 | 4/2006 | Thingbo et al. | |
| 2006/0171633 A1 | 8/2006 | Voigt | |
| 2006/0193636 A1 | 8/2006 | Katagiri et al. | |
| 2006/0219877 A1 | 10/2006 | Kaluzhny et al. | |
| 2007/0127932 A1 | 6/2007 | Qi et al. | |
| 2007/0229838 A1 | 10/2007 | Greening et al. | |

FOREIGN PATENT DOCUMENTS

| | | |
|---|---|---|
| EP | 1606585 | 12/2005 |
| WO | 0003201 | 1/2000 |
| WO | 02052755 | 7/2002 |

OTHER PUBLICATIONS

GB Search Report for Application No. GB816678.7, Dated Jan. 9, 2009.

*Primary Examiner* — Ricky Mack
*Assistant Examiner* — Mahidere Sahle
(74) *Attorney, Agent, or Firm* — Patterson & Sheridan, L.L.P.

(57) ABSTRACT

Methods and apparatus for sampling techniques can constantly monitor a spectral output from a broadband source in order to control a central wavelength of interrogation light supplied by the source for input to a sensor. A first portion of light output from the broadband source passes through a controller module for spectral analysis and referencing to provide measurements that can be used as feedback to actively modify a second portion of the light from the source. This modified second portion thereby controls the central wavelength to ensure accurate determination of sensor response signals received at a receiver.

7 Claims, 3 Drawing Sheets

WAVELENGTH MONITORED AND STABILIZED SOURCE

CROSS-REFERENCE TO RELATED APPLICATIONS

This application is a divisional of U.S. patent application Ser. No. 11/855,297, filed Sep. 14, 2007 now U.S. Pat. No. 7,813,046, which is herein incorporated by reference.

BACKGROUND OF THE INVENTION

1. Field of the Invention

Embodiments of the invention generally relate to optical sensor systems and, more particularly, to improving wavelength stability in broadband source light used to interrogate optical sensors.

2. Description of the Related Art

Optical sensor systems operate by exposing a portion of an optical waveguide to an environmental condition that modulates a light signal transmitted within the optical waveguide. This modulation alters one or more parameters of the light transmitted within the optical waveguide, such as amplitude, power distribution versus frequency/wavelength, phase, or polarization. Analyzing modulated light emerging from the waveguide enables determining values indicative of the environmental condition. Such systems utilize sensors based on, for example, Bragg gratings or interferometers, to measure a wide variety of parameters, such as strain, displacement, velocity, acceleration, flow, corrosion, chemical composition, temperature or pressure. In one example of an optical sensor system, a fiber optic gyroscope (FOG) enables measuring angular rotation since application of force alters the wavelength of light as it travels through a sensing coil of an optical fiber, thereby producing phase changes from which measurements can be made.

Instabilities in a center wavelength of input light provided by a broadband light source may cause variations in sensor response signals produced upon the interrogating light arriving at the optical sensor. For example, broadband sources producing input light without a stable center wavelength when used with a Bragg grating sensor may cause variations in the reflected response signal emitted by the sensor, resulting in incorrect measurements or undesirable noise. In the FOG, the phase change with acceleration depends on wavelength such that any change in the center wavelength of the broadband source input into an interferometer of the FOG produces drifts in a scalar factor associated with the acceleration and wavelength. Accurate and reliable measurements determined by detection of response signals from the optical sensors require a broadband light source outputting light with a center wavelength that does not drift around with time or other environmental changes. However, attempts in many environments to achieve such a stable broadband light source by stabilization and control (e.g., temperature stabilization or vibration dampening) of components proves difficult, expensive and oftentimes insufficient.

Therefore, there exists a need for optical sensing configurations and methods that improve wavelength stability of input broadband light used to interrogate an optical sensor which may include an FOG device.

SUMMARY OF THE INVENTION

In one embodiment, an optical system for producing a stabilized broadband light output to a sensor includes a broadband light source for producing broadband light signals and a splitter dividing the light signals into first and second portions along first and second output pathways, respectively. A controller module having a sweeping tunable filter coupled to the first output pathway of the splitter receives the first portion of the light signals prior to outputting respective filtered light portions to a comb filter and a wavelength reference element, wherein control circuitry is configured to evaluate detected signals from the comb filter and the reference element to generate a control signal output. A wavelength dependent variable attenuator coupled to the second output pathway of the splitter and the control circuitry receives the second portion of the light signals and the control signal output, wherein the attenuator is configured to modify the second portion of the light signals based on the control signal output, thereby providing the stabilized broadband light output.

For one embodiment, an optical system includes a broadband light source for producing broadband light signals and a splitter dividing the light signals into first and second portions. A sweeping tunable filter coupled to the splitter receives the first portion of the light signals prior to outputting respective filtered light portions to a comb filter and a wavelength reference element. Control circuitry configured to evaluate detected signals from the comb filter and the reference element generates a control signal output. A spectrum modifier coupled to the splitter and the control circuitry receives the second portion of the light signals and the control signal output, wherein the modifier is configured to adjust the second portion of the light signals based on the control signal output, thereby providing a stabilized broadband light output. A sensor element couples to the modifier and is configured to provide response signals from interrogation by the stabilized broadband light output that is unswept in time across wavelengths produced by the source. A receiver couples to the sensor element and is configured to detect and process the response signals.

According to one embodiment, a method of stabilizing broadband light output to a sensor includes generating a broadband light and dividing the light into first and second pathways, wherein a controller module wavelength scans light propagating in the first pathway prior to outputting respective filtered light portions to a comb filter and a wavelength reference element of the controller module. The method further includes generating a control signal output with control circuitry based on detected signals from the comb filter and the reference element. Modifying light propagating in the second pathway based on the control signal output produces the stabilized broadband light output.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention relate to sampling techniques which can constantly monitor a spectral output from a broadband source in order to control a central wavelength of interrogation light supplied by the source for input to a sensor. A first portion of light output from the broadband source passes through a controller module for spectral analysis and referencing to provide measurements that can be used as feedback to actively modify a second portion of the light from the source. This modified second portion thereby controls the central wavelength to ensure accurate determination of sensor response signals received at a receiver. In some embodiments, the sensor response signals may be from a fiber-optic gyroscope benefiting from the center wavelength being stabilized, as discussed herein.

Figure 1:
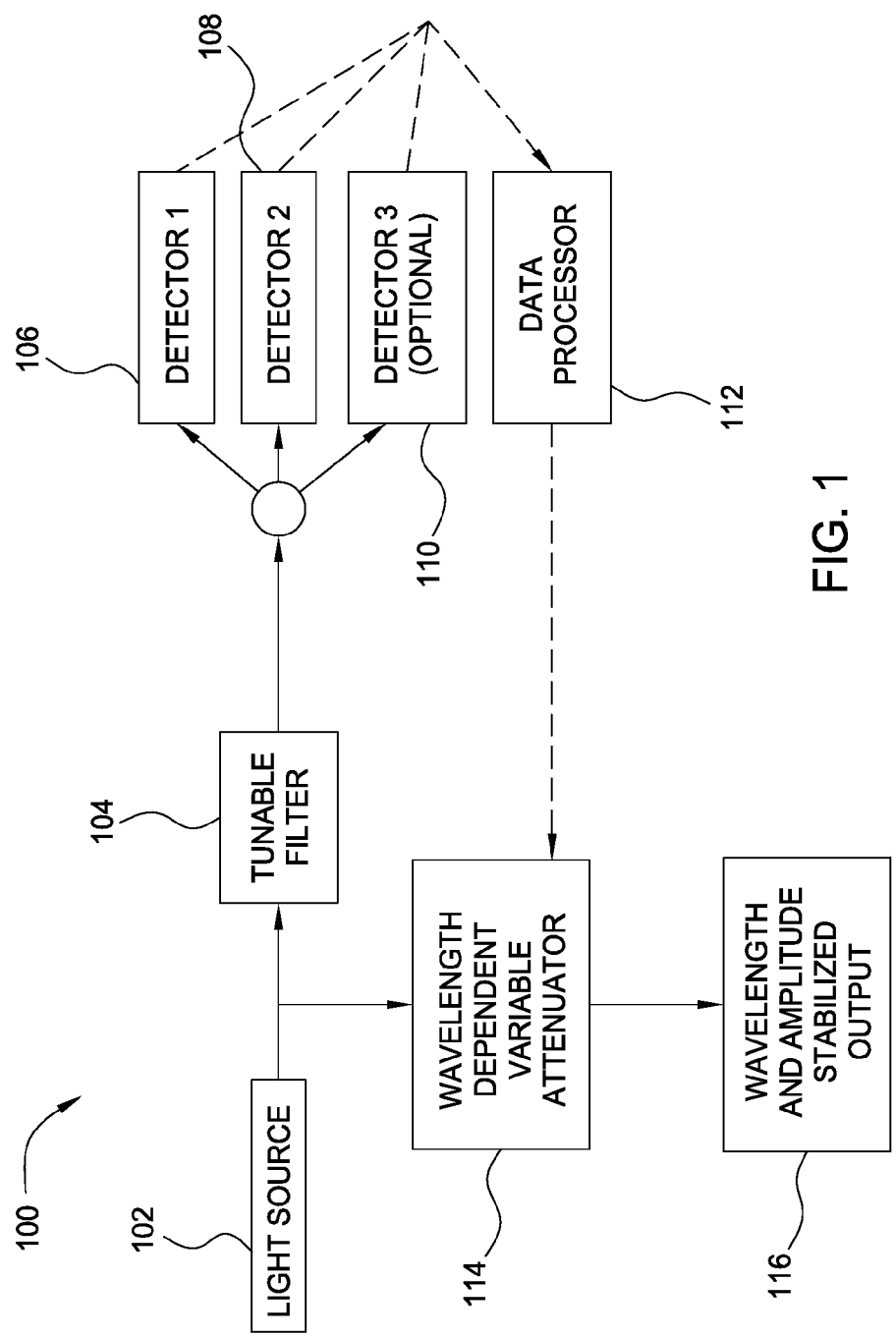
FIG. 1 is a schematic process map of an optical system for producing a stabilized broadband light output in accordance with embodiments of the invention.

FIG. 1 shows a schematic process map of an optical system 100 for producing a stabilized broadband light output 116. The system 100 includes a broadband light source 102, a tunable filter 104, first, second and third detector circuits 106, 108, 110, a data processor 112 and a wavelength dependent variable attenuator 114, which is controlled by signals generated with the data processor 112 to produce the output 116 derived from light signals provided by the source 102. The source 102, e.g., an amplified spontaneous emission (ASE) source, produces the light signals unswept in time across wavelengths and defining a broadband optical spectrum including wavelengths which may range, for example, at least 10 nanometer (nm) or at least 50 nm. The shape of the spectrum may change or drift over time. This instability causes changes in the center wavelength, which is critical in determining output from a sensor (see, FIG. 2). Therefore, control of the attenuator 114 by the processor 112 ensures that the center wavelength of light from the source 102 is maintained by wavelength and amplitude stabilizing the light prior to being output for use in interrogating the sensor.

In operation, a first portion of the light from the source 102 bypasses the tunable filter 104 and enters the attenuator 114. A second portion of light from the source 102 passes through the tunable filter 104 prior to splitting into the first detector circuit 106, the second detector circuit 108, and the third detector circuit 110 that is optional. The tunable filter 104 may sweep across all wavelengths of the spectrum of the source 102 for whole spectrum measurement and analysis. Examples of suitable tunable filters include a piezoelectrically tunable Fabry-Perot (F-P) filter, a tunable acousto-optic filter, or a tunable interference filter. The processor 112 may control the tunable filter 104 to facilitate synchronization of measurements taken with the processor 112 based on signals from the detector circuits 106, 108, 110.

The first detector circuit 106 includes a comb filter, such as an F-P etalon with fixed and known free spectral range, which produces a reference comb spectrum with peaks having a constant, known frequency separation equal to the free spectral range to provide an accurate frequency/wavelength scale. The second detector circuit 108 provides an accurate wavelength reference by, for example, passing light onto at least one fiber Bragg grating (FBG) with a known wavelength. Some embodiments can utilize a reference interference filter without a reference FBG by, for example, using a source envelope to identify one or more reference peaks in the comb spectrum itself for absolute wavelength referencing.

The signals detected in the first and second detector circuits 106, 108 are simultaneously sampled, processed and compared in the data processor 112, providing accurate and repeatable wavelength measurement across the whole measured spectrum. At the same time, the third detector circuit 110 measures spectral power of the light as received in the third detector circuit 110 for correlation to the wavelength measurement. This spectral power may therefore be derived from the first and second detector circuits 106, 108 if power measurements are performed in addition to detecting the comb spectrum and Bragg wavelength. The detected signals in combination from the detector circuits 106, 108, 110 therefore enable monitoring and measuring the optical spectrum of the source 102. If any changes in the spectrum are measured, signals generated by the data processor 112 can control the attenuator 114 to alter attenuation selectively for certain wavelengths of the first portion of light received at the attenuator 114 from the source 102. The control of the attenuator 114 can maintain an identified center wavelength for the output 116.

Figure 2:
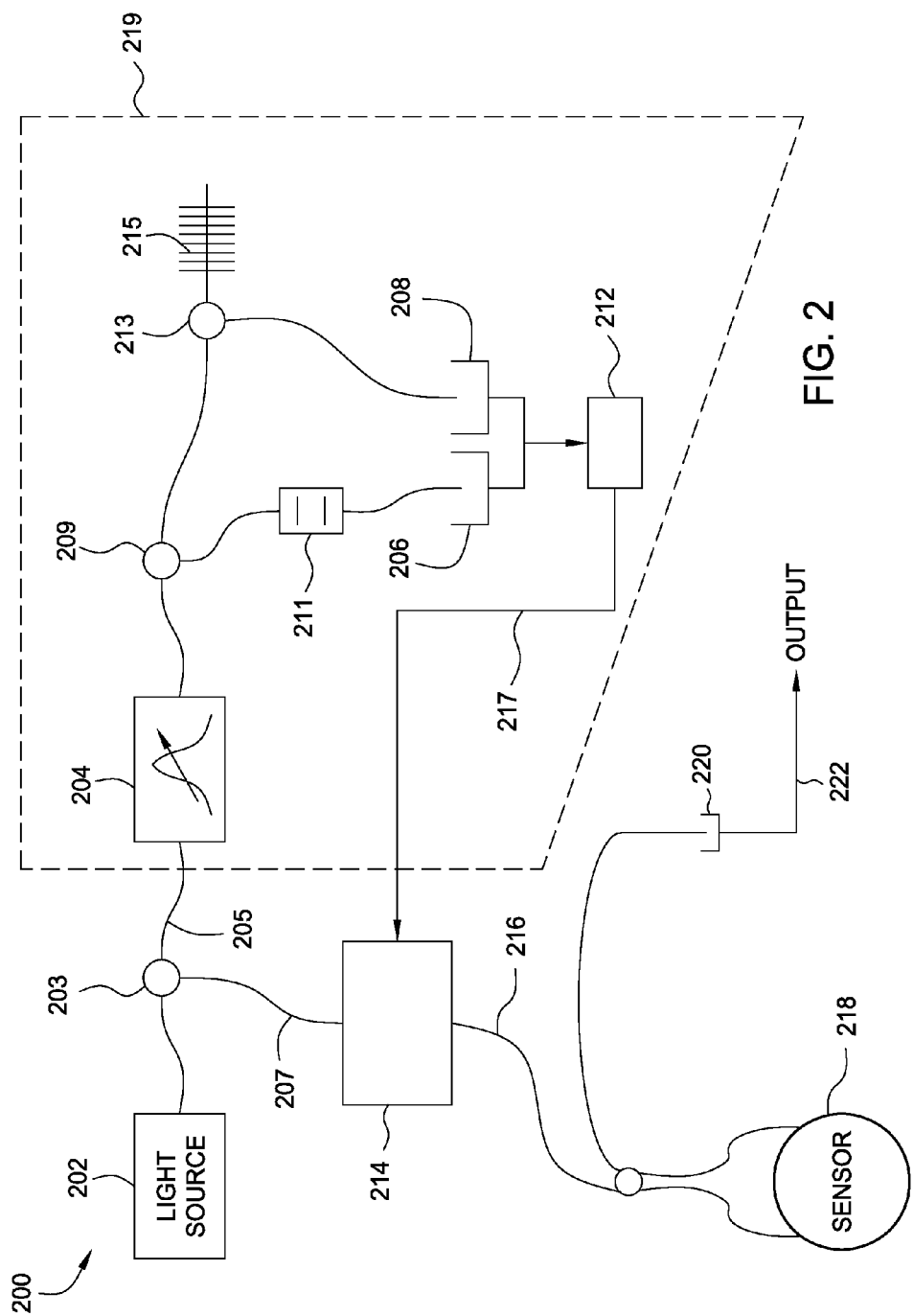
FIG. 2 is a block diagram of an exemplary optical sensor system in accordance with embodiments of the invention.

FIG. 2 illustrates a block diagram of an exemplary optical sensor system 200. The system 200 exemplifies an architecture employing concepts of the process map shown in FIG. 1. Components of the system 200 include a broadband light source 202, a controller module 219, a spectrum modifier 214, a sensor and a sensor response detector and processor 220. For some embodiments, the controller module 219 includes a tunable filter 204, an F-P etalon 211, a Bragg grating reference 215, a comb detector 206, a stable reference artifact detector 208, and a data processor 212.

Light from the source 202 travels to an initial tap or splitter 203 that splits the light into two paths. For some embodiments, the entire spectrum of the light from the source 202 passes continuously through the initial splitter 203 to the controller module 219 along controller optical fiber 205 and to a lead optical fiber 207 coupled to the modifier 214. The tunable filter of the controller module 219 may provide the only wavelength scanning in the system 200 such that sensor interrogating light that does not pass through the controller module 219 may bypass any wavelength scanning of the light from the source 202. The controller optical fiber 205 couples to the tunable filter 204 that wavelength scans the light to provide filtered light. A detection circuit splitter 209 couples the F-P etalon 211 and the Bragg grating reference 215 to the tunable filter 204 and divides the filtered light from the tunable filter 204 to each. A coupler or circulator 213 couples the Bragg grating reference 215 to the artifact detector 208. The comb and artifact detectors 206, 208 respectively sense outputs from the F-P etalon 211 and the Bragg grating reference 215. The data processor 212 receives detected signals from the comb and artifact detectors 206, 208 and evaluates a spectrum of the source 202 based on the detected signals as described heretofore.

The data processor generates control signals 217 input as operating instructions into the spectrum modifier 214 to regulate functioning of the modifier 214. The control signals 217 may instruct the modifier 214 to adjust variable attenuation or amplification of certain wavelengths or dropping of certain wavelengths to ensure that the spectrum of the source 202 as received by the modifier 214 via lead optical fiber 207 is adjusted in a manner that produces a stabilized broadband light output through a sensing string 216 to the sensor 218. For some embodiments, the stabilization may include wavelength and amplitude stabilization and may maintain an identified mean center wavelength. This stabilized broadband light output transmitted through the sensing string 216 interrogates the sensor 218 and may contain at one time substantially all wavelengths produced by the source 202.

For example, the control signals 217 may instruct the modifier 214 to pass the light from the source 202 without alteration if the spectrum evaluated by the processor 212 already has the identified center wavelength. However, the control signals 217 may instruct the modifier 214 to attenuate wavelengths, such as 1530 nm to 1535 nm 10%, to obtain the identified center wavelength when the spectrum evaluated by the processor 212 has a shifted center wavelength different from the identified center wavelength. This example illustrates the ability to control broadband interrogation light with accuracy and in real time.

The sensor string 216 couples to the sensor 218 shown as an optical fiber sensing coil containing between 200 meters and 5.0 kilometers of fiber to form an interferometric fiber-optic gyroscope (IFOG). In operation, the stabilized broadband light output launches into the sensor 218. Rotation of the sensor 218 affects the light, thereby generating response light signals. The response light signals from the sensor 218 propagate to the sensor response detector and processor 220 that then receives the response light signals for measuring rotation of the sensor 218. Determinations of the rotation or other parameter obtained utilizing techniques as described herein may be transmitted as an output 222 to a user via, for example, a display or printout. Further, the output 222 may be used to generate a signal or control a device.

Figure 3:
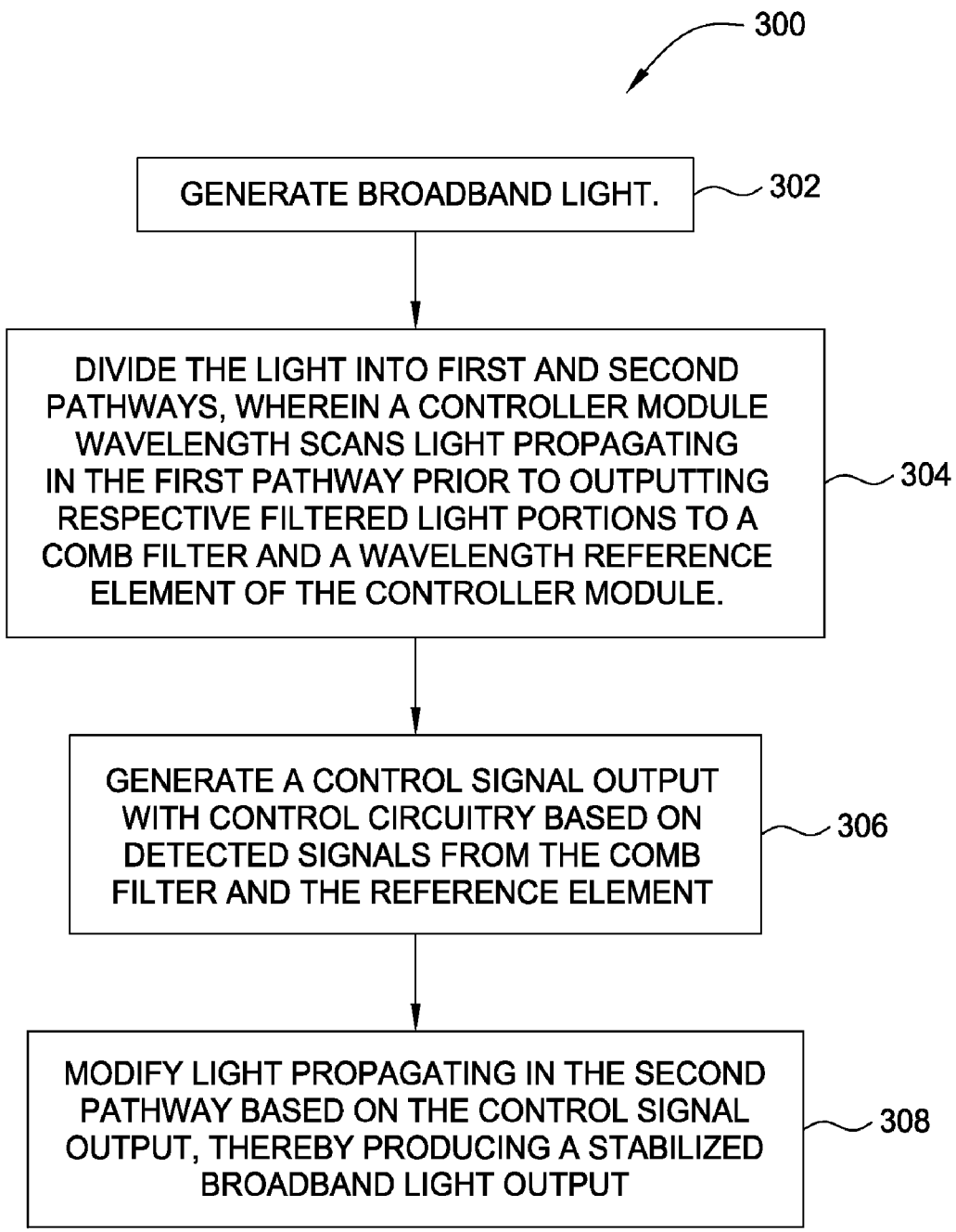
FIG. 3 is a flow process for stabilizing broadband light output to a sensor in accordance with embodiments of the invention.

FIG. 3 depicts a flow process 300 for stabilizing broadband light output to a sensor utilizing systems such as described herein. The process 300 begins at a light generating step 302 where light is emitted from a broadband source. At monitoring tap step 304, dividing the light into first and second pathways occurs with light propagating in the first pathway being wavelength scanned to provide filtered light. The monitoring tap step 304 further includes outputting respective portions of the filtered light to a comb filter and a wavelength reference element. Instruction step 306 generates a control signal output based on detected signals from the comb filter and the reference element using control circuitry. The detected signals provide an indication of a spectrum of the light emitted by the source. Modifying light propagating in the second pathway occurs at spectrum stabilization step 308 based on the control signal output. Modified light produced at step 308 provides a stabilized broadband sensor interrogation light for interrogating a sensor.

While the foregoing is directed to embodiments of the present invention, other and further embodiments of the invention may be devised without departing from the basic scope thereof, and the scope thereof is determined by the claims that follow.

What is claimed is:

1. An optical system, comprising:
a broadband light source for producing broadband light signals;
a splitter dividing the light signals into first and second portions;
a sweeping tunable filter coupled to the splitter to receive the first portion of the light signals prior to outputting respective filtered light portions to a comb filter and a wavelength reference element;
control circuitry configured to evaluate detected signals from the comb filter and the reference element to generate a control signal output;
a spectrum modifier coupled to the splitter and the control circuitry to receive the second portion of the light signals and the control signal output, wherein the modifier is configured to adjust the second portion of the light signals based on the control signal output, thereby providing a stabilized broadband light output; and
a sensor element coupled to the modifier and configured to provide response signals from interrogation by the stabilized broadband light output that is unswept in time across wavelengths produced by the source;
a receiver coupled to the sensor element and configured to detect and process the response signals.

2. The system of claim 1, wherein the sensor element includes a fiber optic gyroscope.

3. The system of claim 1, the modifier is configured to adjust the second portion of the light signals to maintain a mean central wavelength of the stabilized broadband light output.

4. The system of claim 1, the modifier is configured to adjust the second portion of the light signals to maintain an identified spectral shape of the stabilized broadband light output.

5. The system of claim 1, wherein the wavelength reference element includes a Bragg grating and the comb filter includes a Fabry-Perot etalon.

6. The system of claim 1, wherein the source is an amplified spontaneous emission source.

7. The system of claim 1, wherein the stabilized broadband light output includes substantially all wavelengths produced by the source at one time.

* * * * *